(12) United States Patent
Moore et al.

(10) Patent No.: US 6,853,543 B1
(45) Date of Patent: Feb. 8, 2005

(54) POP-UP LAPTOP KEYBOARD

(75) Inventors: Darryl Cynthia Moore, Conyers, GA (US); Edward Michael Silver, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 32 days.

(21) Appl. No.: 10/046,508

(22) Filed: Oct. 26, 2001

(51) Int. Cl.[7] .............................................. G06F 1/16
(52) U.S. Cl. ........................ 361/680; 361/683; 400/682
(58) Field of Search .................... 361/680; 400/680–682

(56) References Cited

U.S. PATENT DOCUMENTS

| | | | |
|---|---|---|---|
| 5,168,427 A | * | 12/1992 | Clancy et al. .............. 361/680 |
| 5,729,429 A | | 3/1998 | Margaritis et al. |
| 5,764,474 A | * | 6/1998 | Youens ....................... 361/680 |
| 5,894,406 A | | 4/1999 | Blend et al. |
| 6,042,282 A | | 3/2000 | Camacho et al. |
| 6,081,207 A | * | 6/2000 | Batio ........................... 341/20 |
| 6,104,604 A | * | 8/2000 | Anderson et al. ........... 361/680 |
| 6,144,554 A | * | 11/2000 | Mok ............................ 361/687 |
| 6,198,624 B1 | | 3/2001 | Margaritis |
| 6,266,234 B1 | | 7/2001 | Leman |

* cited by examiner

*Primary Examiner*—Darren Schuberg
*Assistant Examiner*—Anthony Q. Edwards
(74) *Attorney, Agent, or Firm*—Merchant & Gould

(57) ABSTRACT

An ergonomic laptop computer or other apparatus is disclosed that provides a user a with a more comfortable angle for the user's wrists and hands while using the apparatus. The apparatus includes a keyboard housing having a top surface comprising a plurality of keys, a bottom surface operationally connected to a main computer body and positioning supports connected to the keyboard housing that extend and adjust to allow the keyboard to change its slope relative to the main computer body. The apparatus may be standard on laptop computers or sold as a retrofit kit that replaces existing non-ergonomic laptop keyboards.

31 Claims, 5 Drawing Sheets

POP-UP LAPTOP KEYBOARD

FIELD OF THE INVENTION

The present invention relates generally to an apparatus used in a laptop computer that aids in the comfort and ease of use of the device. The present invention relates specifically to an adjustable keyboard used in a laptop computer or other electronic device that is more ergonomically efficient than conventional laptop computer keyboards.

BACKGROUND

Personal computers are commonly used at the workplace and at home. As people become more dependent on personal computers, time spent using them has increased. Modem ergonomics theory and experience teaches that improper posture of human bodies during the use of computers can produce many types of repetitive, stress and strain injuries, such as Carpal Tunnel Syndrome, and eye fatigue. Conventional theory holds that, in an ergonomically arranged computer unit, the keyboard should be arranged at elbow level while the arms are parallel to the body, and the top of the display unit should be at approximately eye level, or at most 15 degrees below. Manufacturers of desktop computers have taken steps to design their products to alleviate these repetitive-type stress injuries. One example of such an advancement involves using a split keyboard as opposed to a traditional keyboard. In a split keyboard, the keyboard is separated in the middle and the two separate halves are angled in order to allow the wrists to be held in a more natural position while typing.

The typical laptop computer (also referred to as portable personal computers or notebook computers) includes a display screen housing hinged to a main computer base housing. The display screen housing folds down against the main computer base housing where the two housings latch together. The main computer base housing includes the keyboard, disk drives, input/output ports, battery pack, and all hardware associated with running, processing and storing data.

Many conventional laptop computers are not used in an ergonomic fashion. Laptop computers have become more commonplace due to improvements in micro-processing.

Many conventional laptop computers are not used in an ergonomic fashion. Laptop computers have become more commonplace due to improvements in micro-processing speed, weight reduction, battery life, display technology, Internet accessibility, and affordability. As laptop computer technology continues to improve and approaches that of desktop computers, more and more users will use laptop computers as their sole computer device.

While there have been ergonomic improvements incorporated into desktop computers, the small size and need for portability of laptop computers have prevented manufacturers from incorporating many of these ergonomic advances into laptop computers. While some laptop manufacturers have attempted to implement ergonomic advances, such as the split keyboard, further advances are needed.

BRIEF SUMMARY

In the present invention, keyboard positioning supports are presented that are used to adjust the height, slope or angle of a keyboard, with respect to and from the base of a laptop computer or other electronic device, without increasing the size or the device when stowed or transported. Various embodiments of the present invention may be provided.

One embodiment of the present invention comprises an ergonomic laptop computer apparatus that provides a user with a more comfortable angle for the user's wrists and hands while using the computer. The apparatus includes a keyboard housing having a top surface comprising a plurality of keys, a bottom surface operationally connected to a main computer body, and positioning supports connected to the keyboard housing that extend and adjust to allow the keyboard to change its slope relative to the main computer body. The apparatus may be included on laptop computers as manufactured and sold, or sold as a retrofit kit that replaces existing non-ergonomic laptop keyboards.

In one embodiment, the present invention provides an apparatus that includes a main computer body, a display body operationally connected to the main computer body, a keyboard housing having a top surface comprising a plurality of keys, a bottom surface operationally connected to the main computer body, a front edge closest to a user, a back edge farthest from the user, two side edges, and positioning supports functionally connected to the keyboard housing operable for extending and adjusting the slope of the keyboard housing relative to the underlying main computer body.

In an embodiment, the keyboard housing defines an embedded compartment in the main computer body and the front edge of the keyboard housing is pivotally connected to the main computer body, allowing for the back edge of the keyboard to be raised while the front edge pivots about an axis or rotation. The positioning supports include legs, a flap, thumbscrews, rods, or any other suitable mechanism that can support the slope and weight of the keyboard while in an elevated position. The positioning support provides for the slope adjustment of the keyboard housing in discrete steps and continuous adjustment, allowing the user options in keyboard slope angles.

The present invention provides for an ergonomic advancement while the computer is being used, and compact and easy to retract ergonomics that do not interfere with the size or portability of the laptop computer. The user has the option of using the ergonomic advancement or typing on the keyboard in a traditional non-ergonomic position.

DETAILED DESCRIPTION

As required, a detailed description of the present invention is disclosed herein; however, it is to be understood that the disclosed embodiments are merely exemplary of the invention that may be embodied in various and alternative forms. Specific structural and functional details disclosed herein are not to be interpreted as limiting, but merely as a basis for the claims and as a representative basis for teaching one skilled in the art to variously employ the present invention.

Figure 1:
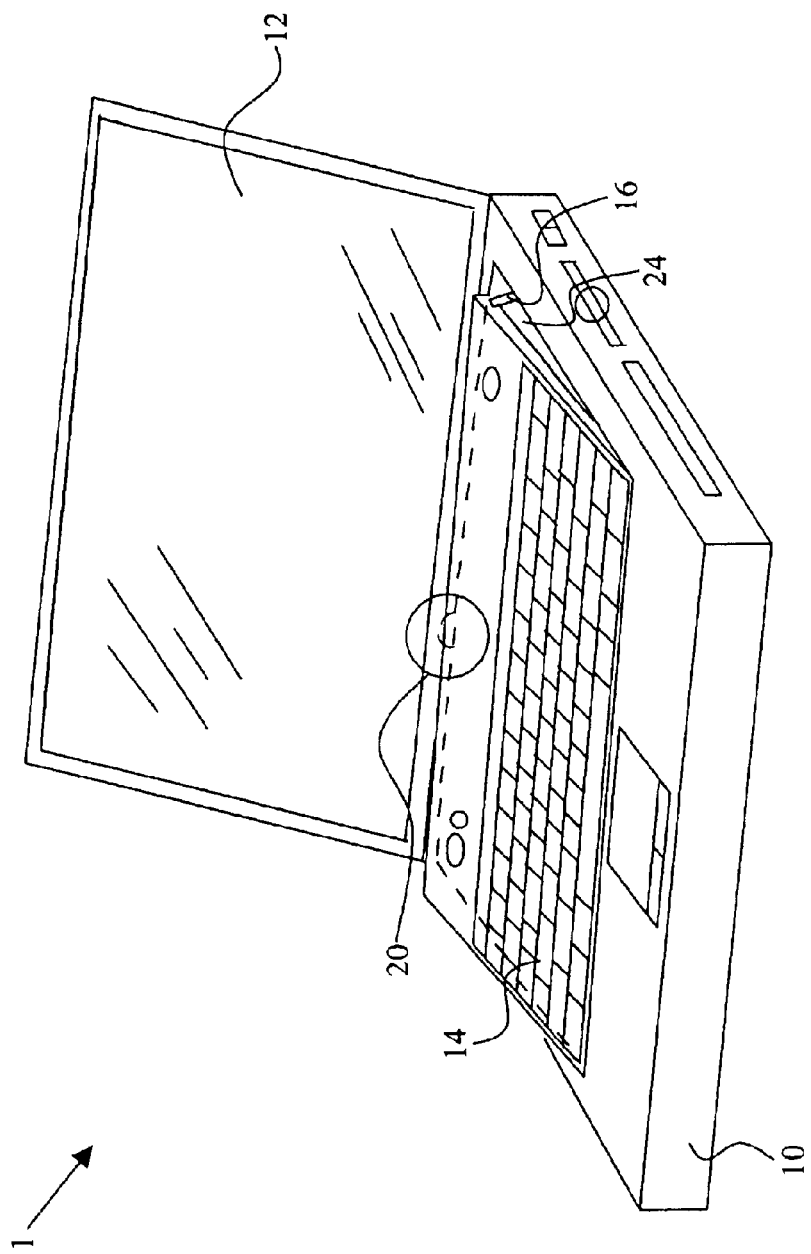
FIG. 1 is a perspective view of one embodiment of the present invention illustrating an ergonomic keyboard in a raised position, showing collapsible controllably extendable supportive members, with the front edge of the keyboard pivotally and functionally connected to the main computer base.

FIG. 1 illustrates one embodiment of the present invention. A laptop computer 1 includes a main computer body 10 with an embedded keyboard 14, and a display unit 12. The computer body 10 is electronically connected with the keyboard 14 and the display unit 12. The keyboard comprises a housing 14 having a top surface, a bottom surface, a front edge closest to the user, a rear edge farthest from the user, and two side edges. The keyboard includes a plurality of keys on the top surface having the standard QWERTY configuration. Alternative embodiments may include other keyboard layouts, such as a split keyboard.

The keyboard housing 14 defines a cavity 24 in the main computer base 10. The cavity 24 is a recess in which the keyboard housing 14 resides while the keyboard is in both elevated and retracted positions. Keyboard positioning supports 16 are connected at two ends to the bottom surface of the keyboard housing 14 at the rear edge, the side edges, or both. Referring to FIG. 1, two positioning supports 16 are disposed on the bottom surface of the keyboard housing 14, proximal to the rear edge. The positioning supports 16 comprise legs attached at one of their ends to the keyboard housing 14, and fold into a recess in the bottom surface of the keyboard housing 14, allowing them to store flush with the bottom surface of the keyboard housing 14. In an alternative embodiment, one positioning support is connected to the keyboard housing 14, and folds and retracts in the manner described above.

The length of the positioning support 16 is adjustable and/or extendable in order to adjust the slope of the keyboard 14 with respect to the underlying main computer body 10. The keyboard housing 14 includes a recess 19 for storing the positioning support 16 when retracted. The recess is of a specific size and shape to accommodate a specific positioning support and allow the support to be stored flush with the housing. The positioning support 16 is made of a material sufficiently strong enough to support the weight of the keyboard 14 and typing pressure applied by the user. Preferably, the overall stability of the laptop computer 1 is not compromised in any way. The positioning supports are connected to the keyboard housing using screws, bolts, glue, or like fastening mechanisms. In an alternative embodiment, the positioning supports 16 may be fastened to a molded piece of the keyboard housing 14.

Figure 2:
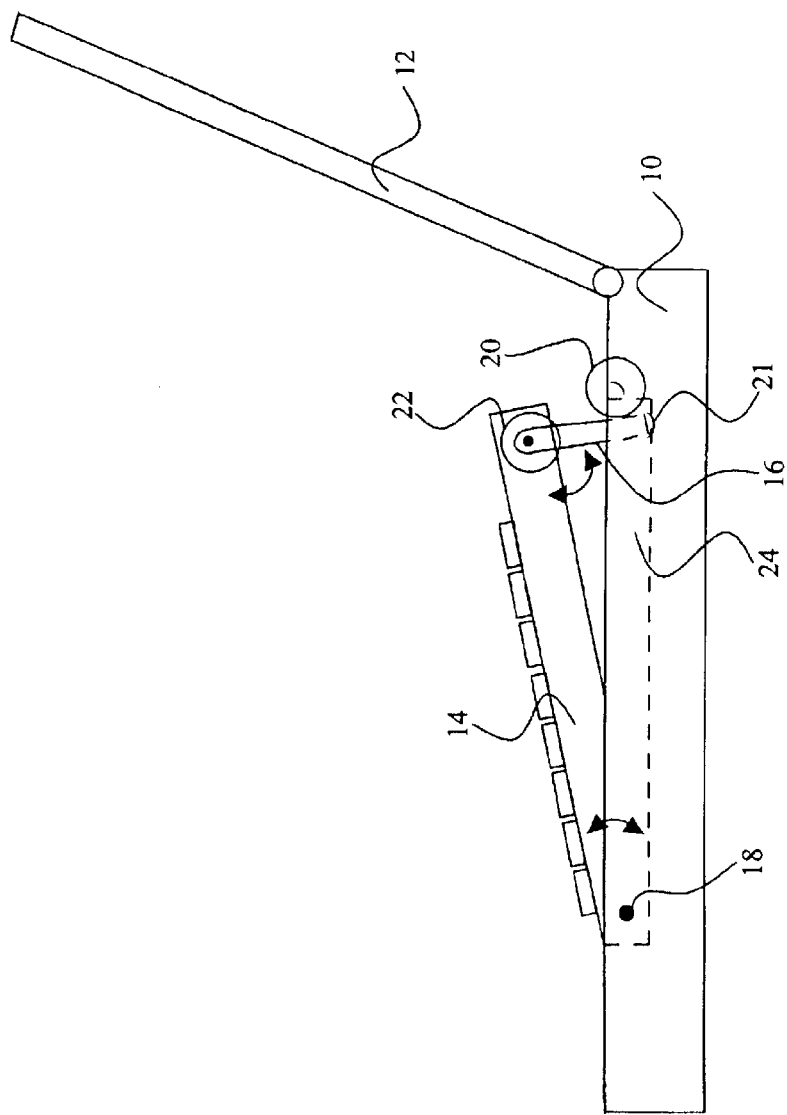
FIG. 2 is a side perspective view of the device of FIG. 1 illustrating the movement of one embodiment of two positioning supports.

Referring to FIG. 2, the main computer base 10 includes a cavity 24 in which the keyboard housing 14 rests. The computer base 10 may also include a receiver 21 for receiving the positioning support 16. The receiver 21 may comprise a recess, a pad, or any other suitable mechanism for receiving a positioning support 16 and providing stability to the keyboard housing 14.

The slope of the keyboard 14, relative to the computer base 10, is adjusted by raising the rear edge of the keyboard housing 14 up from the underlying main computer base 10. The rear edge is extracted and/or retracted using a mechanism 20, such as a lever, push button, finger indent, or other method for accessing and raising the rear edge of the keyboard housing. The extracting and/or retracting mechanism 20 may be found anywhere on the main computer body 10, the keyboard housing 14 or both. In one embodiment, the extracting mechanism is an indent 20 on the rear edge of the keyboard housing 14 adjacent to the rear edge of the computer base cavity 24. When the positioning support 16 is retracted into or against the keyboard housing 14, the keyboard 14 lies flush with the top of the computer base 10 and does not affect the ability of the laptop computer 1 to close properly. When the positioning support 16 is at a user desired extension position, the keyboard 14 is sloped providing for a more comfortable typing position.

The front edge of the keyboard housing 14 is pivotally connected 18 to the main computer base 10. This allows for the keyboard housing 14 to remain securely connected to the main computer base 10 while the rear edge of the keyboard housing 14 is in a raised position. In a further embodiment, a ratchet hinge, or like mechanism, is used at the pivot attachment point 18 to provide additional support. The adjustable locking ratchet hinge has an adjustable friction resistance and allows retention of the keyboard housing 14 at any desired angle. In still another embodiment, the ratchet hinge or like mechanism may provide for keyboard housing 14 support alone, without the aid of a rear edge connected keyboard 14 positioning support 16. The ratchet hinge or like mechanism, may have a lever, button, latch, or like actuating mechanism for operation.

Figure 3:
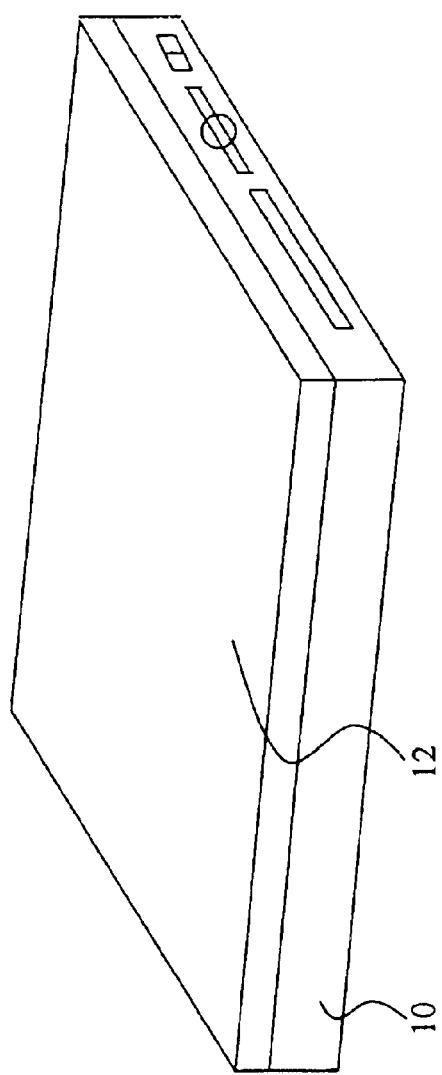
FIG. 3 is a perspective view illustrating the ergonomic keyboard of FIG. 1 in a retracted position and the display folded onto the main computer base.

Referring to FIG. 3, when the positioning support (16, FIG. 1) is retracted into or against the keyboard housing (14, FIG. 1), the keyboard lies flush with the top of the computer base 10 and does not affect the ability of the laptop display 12 to close properly onto the main computer base 10.

The positioning supports (16, FIG. 1) may be adjusted by the user by raising up the rear edge of the keyboard housing 14 in any manner described above, and physically extending the positioning support 16. In all the embodiments shown, the support 16 is not moved by motors or gears, but other embodiments may include a motor or gear supporting or adjusting the keyboard. The positioning support 16 may comprise one or more of the following: a leg, a flap, a thumbscrew, a rod, or any other suitable mechanism for support.

Figure 4:
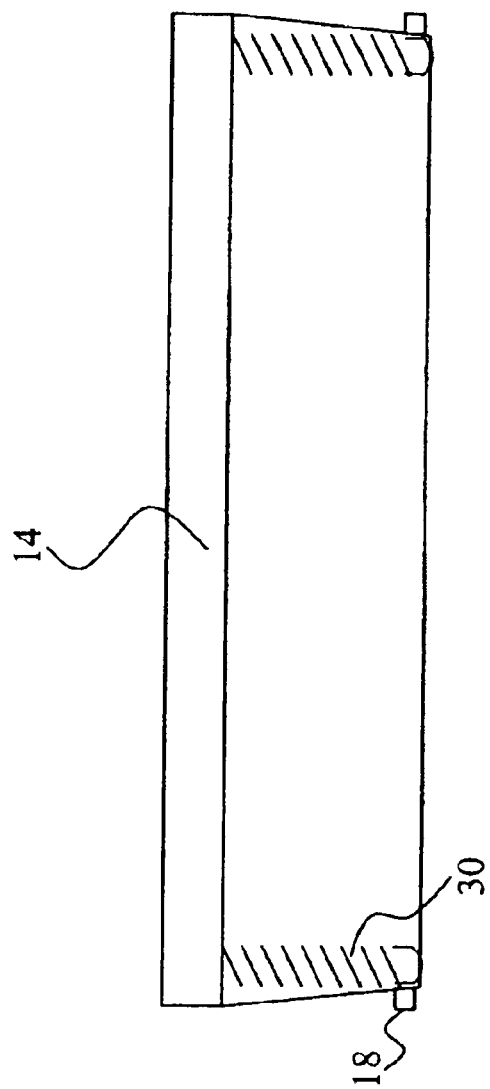
FIG. 4 is a rear perspective view of a keyboard housing removed from the main computer base in order to illustrate one embodiment of thumbscrew positioning supports.
Figure 5:
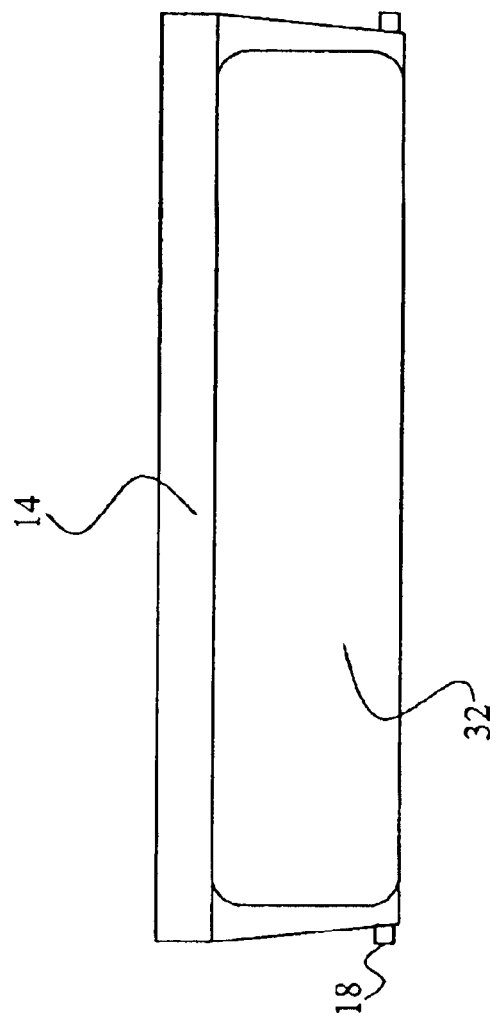
FIG. 5 is a rear perspective view of a keyboard housing removed from the main computer base in order to illustrate one embodiment of a flap positioning support.

Referring to FIG. 4, in one embodiment, positioning support 16 comprises a thumbscrew 30. The thumbscrew may comprise a flat-sided or knurled head so that it may be turned by the thumb and forefinger, allowing for continuous adjustment. Referring to FIG. 5, in an alternative embodiment, the positioning support comprises a flap 32. The flap may be of any size, length, and thickness. In one embodiment, the flap 32 folds into a recess in the keyboard housing 32 and rests flush against the housing 14.

As stated above, the positioning support may be connected to the keyboard housing using screws, snaps, hinges, latches, pins, fasteners or any other suitable mechanism for attachment. The positioning support 16 is able to be adjusted to varying angles, heights and positions. The positioning support 16 provides for a continual keyboard 14 slope adjustment and discrete steps of adjustment. Adjustment may be accomplished by a thumbscrew, slots, ratchet hinge, friction mechanism, or any other mechanism that provides for continual or discrete step adjustment. According to various embodiments, the positioning supports 16 have a fixed orientation or fold, retract or telescope.

In an alternative embodiment, the positioning support 16 includes a spring mechanism. In such an embodiment, the keyboard housing 14 is raised up as described above. The positioning support 16 is then extended providing for a desired slope of the keyboard 14. The spring mechanism provides a way of retracting the positioning support 16. A user simply pulls up slightly on the keyboard housing 14 and the support 16 automatically retracts, providing an easy way of returning the keyboard 14 to its flush position. In a further embodiment, the spring mechanism positioning support 16 is retracted using a switch, button, lever or other spring triggering mechanism.

In one embodiment, the ergonomic keyboard 14 of the present invention is a standard feature included in the manufacture of a new laptop computer (1, FIG. 1). In an alternative embodiment, the keyboard 14 is a retrofit item allowing for the replacement of an existing non-ergonomic keyboard with the ergonomic keyboard 14 of the present invention. If a keyboard in a currently existing laptop computer breaks, replacements are available. The present invention provides for a process in which a retrofit ergonomic keyboard 14 is installed in a laptop computer 1 in order to replace an existing, non-ergonomic keyboard. The process comprises removing the non-ergonomic keyboard from the main computer body, attaching the new retrofit keyboard to the main computer body operationally, and at the pivot point 18. The retrofit keyboard 14 includes a keyboard housing 14 with one or more slope adjustment positioning supports 16 and the necessary components for functionally connecting the keyboard to the main computer base (10, FIG. 1), such as a front edge pivot point (18, FIG. 2) attachment. The connection components may include some sort of wire, wireless, or infra-red interface that operationally attaches the keyboard 14 to the main computer base 10. The retrofit keyboard 14 kit may additionally include a cover that will protect the hardware within the main computer base 10 when the ergonomic keyboard 14 is installed.

In alternative embodiments, newly manufactured, as well as retrofit ergonomic keyboards 14, are not limited to use in laptop computers. Any device containing a keyboard may include the apparatus of the present invention, such as personal digital assistants, pocket PCs, and other portable handheld computers.

Apparatus and processes providing for ergonomics in portable computers and other electronic devices have been described herein. These, and other variations, which will be appreciated by those skilled in the art, are within the intended scope of this invention as claimed below. It is to be understood that the present invention may be embodied with various other changes, modifications and improvements, which may occur to those skilled in the art, without departing from the spirit and scope of the invention defined in the following claims.

What is claimed is:

1. An apparatus comprising:
   a main body;
   a keyboard housing having a top surface, a bottom surface operationally connected to the main body, a front edge closest to a user, a back edge farthest from the user and two side edges; and
   a positioning support functionally connected to the keyboard housing operable for extending and adjusting a slope of the keyboard housing such that the keyboard housing is positioned at a plurality of angles between an open position and a closed position relative to the main body, wherein the positioning support comprises a thumbscrew.

2. The apparatus of claim 1, further comprising one or more additional positioning supports.

3. The apparatus of claim 1, wherein the top surface of the keyboard housing comprises a plurality of keys.

4. The apparatus of claim 1, wherein the positioning support is attached at one end to at least one of: the top surface, the bottom surface, the front edge, the back edge, and the two side edges of the keyboard housing.

5. The apparatus of claim 1, wherein the keyboard housing defines an embedded compartment in the main body.

6. The apparatus of claim 1, wherein the front edge of the keyboard housing is pivotally connected to the main body.

7. The apparatus of claim 1, wherein the positioning support provides for continuous slope adjustment of the keyboard housing.

8. The apparatus of claim 1, wherein the keyboard top surface is flush with the main body when the positioning support is retracted.

9. The apparatus of claim 1, wherein the main body comprises a laptop computer body.

10. An ergonomic apparatus, comprising:
    a keyboard housing having a top surface, a bottom surface functionally connected to a main body, a front edge closest to a user, a back edge farthest from the user and two side edges; and
    a positioning support operable for adjusting a slope of the keyboard housing such that the keyboard housing is positioned at a plurality of angles between an open position and a closed position in relation to the main body, wherein the positioning support comprises a thumbscrew.

11. The apparatus of claim 10, further comprising one or more additional positioning supports.

12. The apparatus of claim 10, wherein the top surface of the keyboard housing comprises a plurality of keys.

13. The apparatus of claim 10, wherein the positioning support is attached at one end to at least one of: the top surface, the bottom surface, the front edge, the back edge, and the two side edges of the keyboard housing.

14. The apparatus of claim 10, wherein the keyboard housing is standard equipment on a new laptop computer.

15. The apparatus of claim 10, wherein the keyboard housing defines an embedded compartment in the main body.

16. The apparatus of claim 10, wherein the front edge of the keyboard housing is pivotally connected to the main body.

17. The apparatus of claim 10, wherein the positioning support provides for continuous slope adjustment of the keyboard housing.

18. The apparatus of claim 10, wherein the keyboard top surface is flush with the main body when the positioning support is retracted.

19. The apparatus of claim 10, wherein the main body comprises a laptop computer body.

20. A process for retrofitting a laptop computer, comprising:
    replacing an exiting keyboard with a keyboard housing comprising a positioning support operable for adjusting a slope of the keyboard housing such that the keyboard housing is positioned at a plurality of angles between an open position and a closed position in discrete steps such that the keyboard housing is adjustable to varying angles desired by a user in relation to an underlying main body, wherein the positioning support comprises a thumbscrew.

21. The process of claim 20, wherein the keyboard housing comprises a top surface, a bottom surface, a front edge closest to a user, a back edge farthest from the user and two side edges.

22. process of claim 20, wherein the underlying main body comprises a laptop computer body.

23. The process of claim 20, wherein the keyboard housing further comprising one or more additional positioning supports.

24. The process of claim 20, wherein the top surface of the keyboard housing comprises a plurality of keys.

25. The process of claim 20, wherein the positioning support is attached at one end to at least one of: the top surface, the bottom surface, the front edge, the back edge, and the two side edges of the keyboard housing.

26. The process of claim 20, wherein the front edge of the keyboard housing is pivotally connected to the main body.

27. The process of claim 20, wherein the positioning support provides for continuous slope adjustment of the keyboard housing.

28. The process of claim 21, wherein the keyboard top surface is flush with the main body when the positioning support is retracted.

29. The process of claim 20, wherein the keyboard housing is operationally connected to the main body by at least one of: a wire, wireless, and an infra-red interface.

30. The process of claim 20, wherein the keyboard housing comprises an ergonomic keyboard housing.

31. An ergonomic keyboard comprising:
a main body;
a keyboard housing having a top surface, a bottom surface operationally connected to the main body, a front edge closest to a user, a back edge farthest from the user and two side edges; and
a positioning support functionally connected to the keyboard housing operable for extending and adjusting a slope of the keyboard housing relative to the main body, wherein the positioning support comprises a thumbscrew.

\* \* \* \* \*